(12) United States Patent
Wallman

(10) Patent No.: US 7,124,407 B1
(45) Date of Patent: Oct. 17, 2006

(54) METHOD AND APPARATUS FOR CACHING NATIVE CODE IN A VIRTUAL MACHINE INTERPRETER

(75) Inventor: David Wallman, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 828 days.

(21) Appl. No.: 09/641,035

(22) Filed: Aug. 16, 2000

(51) Int. Cl.
  *G06F 9/45* (2006.01)
  *G06F 9/44* (2006.01)

(52) U.S. Cl. ............... 717/154; 717/151; 717/139; 717/118

(58) Field of Classification Search ........ 717/100–178; 703/27
See application file for complete search history.

(56) References Cited

U.S. PATENT DOCUMENTS

| | | | | |
|---|---|---|---|---|
| 4,991,088 A * | 2/1991 | Kam | ............................ | 717/160 |
| 5,768,593 A * | 6/1998 | Walters et al. | ............... | 717/141 |
| 5,848,274 A * | 12/1998 | Hamby et al. | ............... | 717/153 |
| 5,889,996 A * | 3/1999 | Adams | ........................ | 717/139 |
| 6,243,668 B1 * | 6/2001 | Le et al. | ........................ | 703/27 |
| 6,256,784 B1 * | 7/2001 | Grove | ........................ | 717/139 |
| 6,282,706 B1 * | 8/2001 | Chauvel et al. | ............. | 717/150 |
| 2001/0042173 A1 * | 11/2001 | Bala et al. | ................... | 711/125 |
| 2002/0104076 A1 * | 8/2002 | Shaylor | ...................... | 717/148 |
| 2002/0147969 A1 * | 10/2002 | Lethin et al. | ............... | 717/138 |

OTHER PUBLICATIONS

Piumarta et al: "Optimizing Direct Threaded Code by Selective Inlining", ACM Sigplan Notices, Association for Computing Machinery, New York, US, vol. 33, No. 5, May 1, 1998, pp. 291-300, XP000766278, ISSN: 0362-1340, paragraphs '003!-'03.2!
Ebcioglu K et al: "Daisy: Dynamic Compilation for 100% Architectural Compatibility", Computer Architecture News, Association for Computing Machinery, New York, US, vol. 25, No. 2, May 1, 1997, pp. 26-37, XP000656564, ISSN: 0163-5964, paragraph '000A!, paragraph '03.2!

* cited by examiner

*Primary Examiner*—Kakali Chaki
*Assistant Examiner*—Insun Kang
(74) *Attorney, Agent, or Firm*—Beyer Weaver & Thomas, LLP

(57) ABSTRACT

Techniques for increasing the performance of virtual machines are disclosed. It can be determined whether a program instruction which is to be executed by the virtual machine is a branch instruction, and whether a basic block of code is present in a code cache. If so, the basic block of code can be executed. The basic block includes code that can be executed for the program instruction. A cache can be used to store the basic block for program instructions that are executed by the virtual machine. The program instruction may be a bytecode and the code cache can be implemented as a native code cache.

11 Claims, 11 Drawing Sheets

METHOD AND APPARATUS FOR CACHING NATIVE CODE IN A VIRTUAL MACHINE INTERPRETER

BACKGROUND OF THE INVENTION

1. Field of Invention

The present invention relates generally to computing systems which use virtual machines. More particularly, the present invention relates to a technique increasing overall virtual machine performance.

2. Description of the Related Art

The Java™ programming language is an object-based high level programming language developed by Sun Microsystems, Inc. of Palo Alto, Calif. The Java™ programming language is designed to be portable enough to be executed on a wide range of computers which include, but are not limited to, small personal computing device and supercomputers.

Programs written in the Java™ programming language, i.e., Java™ programs, are compiled into class files which include virtual machine instructions, e.g., bytecodes, for a Java™ virtual machine. In essence, a Java™ virtual machine is a software emulator of a "generic" computer. Virtual machine instructions may be run, unmodified, on substantially any computer system that has a virtual machine implementation. As such, virtual machines are both portable and flexible. In addition, other programming languages may be compiled into Java™ virtual machine instructions and executed by a Java™ virtual machine.

A Java™ virtual machine has an interpreter that is executed as an interpreter program, i.e., software. Conventional interpreters are arranged to decode and to execute the virtual machine instructions of an interpreted program one instruction at a time during execution. Compilers, which are also associated with a virtual machine, decode source code into native machine instructions prior to execution so that decoding it is not necessary to perform decoding during execution. Conventional interpreters decode each instruction each time the instruction is executed. In other words, conventional interpreters repeatedly decode each instruction each time the instruction is executed. As such, since an instruction is decoded by a conventional interpreter each time the instruction is encountered, execution of interpreted programs is typically substantially slower than execution of compiled programs since the execution of compile programs may occur on an associated native machine or computer system without necessitating decoding.

As the popularity of small computing devices, e.g., cellular telephones and personal digital assistants, which execute code written in the Java™ programming language increases, the demand for better performing Java™ virtual machines is also increasing. One conventional method for increasing the execution speed and, hence the performance, of Java™-based interpreted programs of virtual machine instructions involves utilizes a just-in-time (JIT) compiler to translate Java™ bytecodes into native code substantially "on-the-fly." A JIT compiler compiles an entire Java™ function just before the Java™ function is called. However, native code generated by a JIT compiler does not always run faster than code executed by an interpreter. For example, if the interpreter is not spending the majority of its time decoding the Java™ virtual machine instructions, then compiling the instructions with a JIT compiler may not increase the execution speed. In some instances, execution of the virtual machine may even be compromised by utilizing the JIT compiler, e.g., if the overhead associated with compiling the instructions is more than the overhead associated with interpreting the instructions.

In general, at least parts of a JIT compiler are platform specific. As a result, if a virtual machine with a JIT compiler is to be ported to a different platform, at least the platform-specific parts of the JIT compiler, e.g., a code generator, must be rewritten to accommodate the new platform. Rewriting platform-specific parts of a JIT compiler may be a time-consuming task.

Further, a JIT compiler is often associated with a substantial amount of code. That is, JIT compilers often require a relatively significant portion of memory. Even a "simple" JIT compiler such as a JIT compiler which is substantially arranged only to generate code and not to perform extensive optimizations, requires more memory than is typically available in small devices. As will be appreciated by those skilled in the art, a standard JIT compiler may require memory to store an intermediate representation of compiled code, to store JIT compiler code and data, and to store native code corresponding to entire Java™ methods.

Therefore, what is desired is a technique for reliably increasing the performance of virtual machines. More particularly, what is needed is a method and an apparatus for increasing the performance of virtual machines in environments with limited memory resources.

SUMMARY OF THE INVENTION

The present invention relates to the efficient implementation of a virtual machine in a computing environment. According to one aspect of the present invention, a method for increasing the performance of a virtual machine includes obtaining a program instruction to be executed by the virtual machine, determining whether the program instruction is a branch instruction, and determining whether a basic block is present in a code cache if the program instruction is a branch instruction. The basic block includes code, and the code cache is associated with the virtual machine. Finally, the method includes executing the code included in the basic block when if the basic block is present. In one embodiment, the program instruction is a bytecode and the code cache is a native code cache.

In another embodiment, when the basic block is not present in the code cache, the method includes interpreting the program instruction and copying code corresponding to the program instruction into the code cache. In such an embodiment, the method may also include allocating space in the code cache for the code corresponding to the program instruction, in addition to providing the code corresponding to the program instruction with a label.

According to another aspect of the present invention, a computing system includes a virtual machine which has a code cache and an interpreter. The interpreter is arranged to obtaining a bytecode and to determine whether the bytecode is a branch bytecode. The interpreter is also arranged to determine whether a basic block is present in the code cache if the bytecode is a branch bytecode. The basic block includes native code, and the interpreter causes the native code to be executed when it is determined that the basic block is present. In one embodiment, the interpreter is further arranged to interpret the bytecode when it is determined that the bytecode is not a branch bytecode.

According to yet another aspect of the present invention, a computer-implemented method for increasing the performance of an interpreter includes identifying a portion of compiled code which corresponds to a block of source code, and copying the portion of compiled code directly into a code cache without first generating an intermediate representation. In one embodiment, the code cache is a native code cache, and the portion of compiled code is native code.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Although just-in-time (JIT) compilers are effective for translating bytecodes, e.g., bytecodes associated with the Java™ programming language developed by Sun Microsystems, Inc., of Palo Alto, Calif., JIT compilers generally require a substantial amount of memory, and may involve significant overhead. As small computing devices generally have a limited amount of memory, while users all small computing devices have an expectation of a relatively high level of performance, however, the use of JIT compilers is not always desirable.

By copying native code, e.g., native binary code, corresponding to a bytecode into a cache, and adding interpreter code which labels the code copied into the cache, the native code may be available on the cache for future use. As will be understood by those skilled in the art, code and data associated with most processor architectures is addressed independently. Hence, when a piece of code in a code segment is copied to a new location, the results of executing the piece of code from within the data segment and from the new location will be the same, provided that no branch instructions which have references outside the piece of code exist.

In one embodiment, interpreter code which copies native code corresponding to a just-executed bytecode into a native code cache may be added to an interpreted program. By copying native code into a native code cache, a substantially compiled version of a basic block is then available on the native code cache. Hence, porting is not needed, and the need to recompile native code for different platforms is avoided. Instead, substantially only an interpreter with JIT compilation technology would be recompiled for different platforms.

Generally, an interpreter may execute a bytecode program by repeatedly executing an execute step, an advance step, and a dispatch step. An execute step executes a current bytecode, an advance step advances a bytecode pointer to a subsequent bytecode, and a dispatch step fetches the bytecode identified by the bytecode pointer. The dispatch step also jumps to the piece of native machine code that implements the identified bytecode, e.g., the dispatch operation jumps to an execution step. As will be understood by those skilled in the art, the execution of the execute-advance-dispatch sequence for a bytecode is often referred to as an "interpretation cycle."

With reference to FIGS. 1a–e, the execution of a source code statement X:=A+B after the source code statement is compiled into bytecodes will be described in accordance with an embodiment of the present invention. Instructions 104 associated with the source code statement X:=A+B may be executed by a virtual machine. As will be understood by those skilled in the art, a virtual machine may be implemented as a stack based machine that includes a stack 110 with frames 114a–f which are indexed by a stack pointer 118.

Figure 1A:
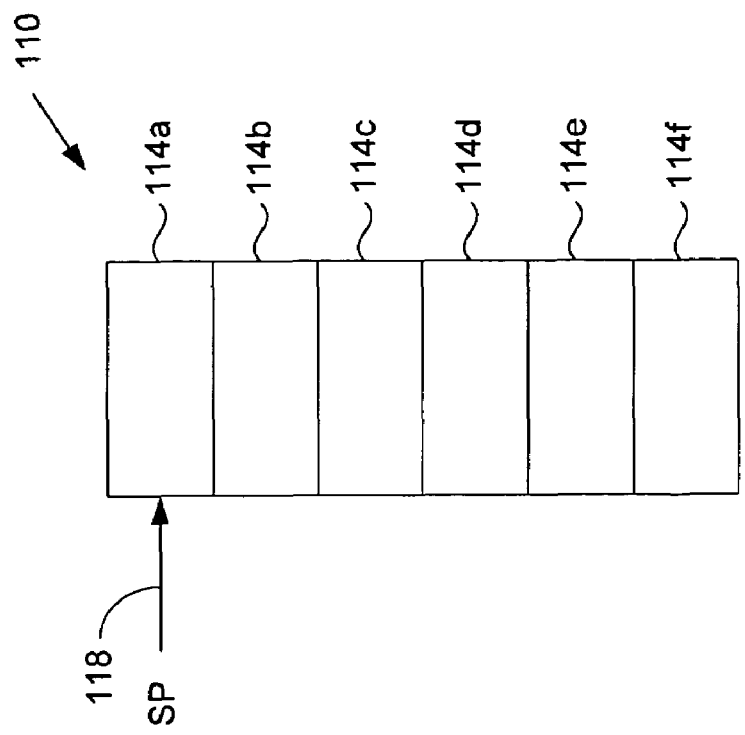
FIGS. 1a–1e are a diagrammatic representation of a program executed by an interpreter and a stack which stores data associated with the program in accordance with an embodiment of the present invention.
Figure 1B:
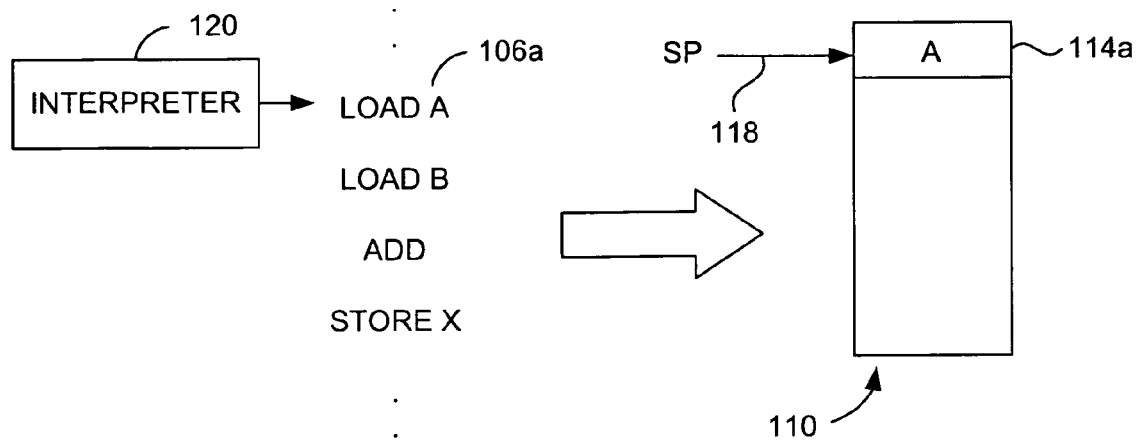
Figure 1C:
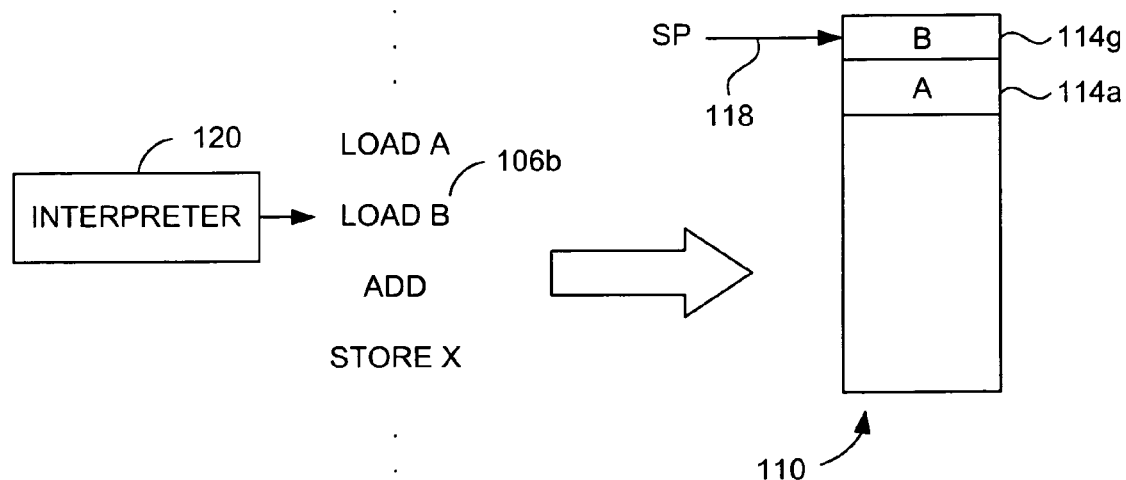

Once a first instruction 106a of instructions 104 is interpreted by an interpreter 120, a value of A is pushed onto stack 110 at a location 114a identified by stack pointer 118 which points to a "current" location within stack 110, as shown in FIG. 1b. After interpreter 120 executes first instruction 106a, interpreter 120 advances to a second instruction 106b, and dispatches second instruction 106b, as shown in FIG. 1c. Like first instruction 106a of FIG. 1b, second instruction 106b is a load or push instruction. Hence, the execution of second instruction 106b places a value of B onto stack 110 at a location 114g specified by stack pointer 118.

Figure 1D:
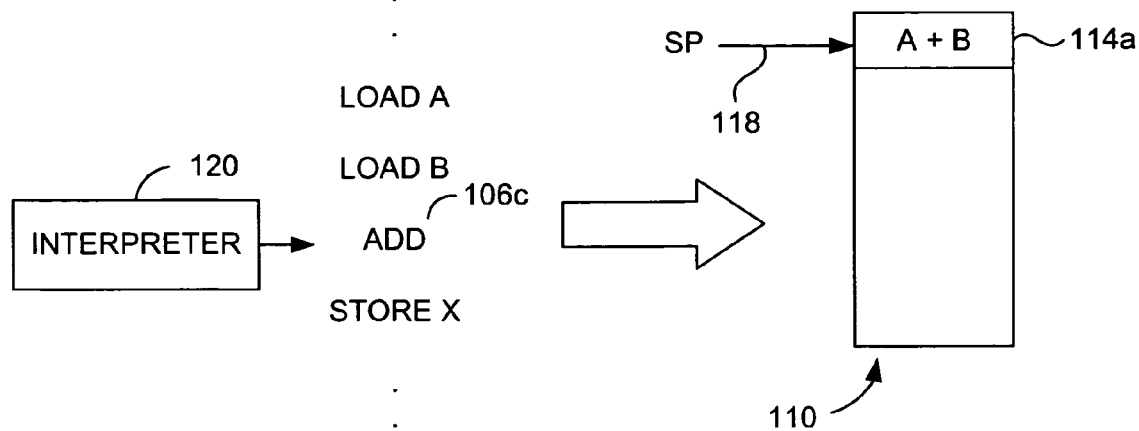
Figure 1E:
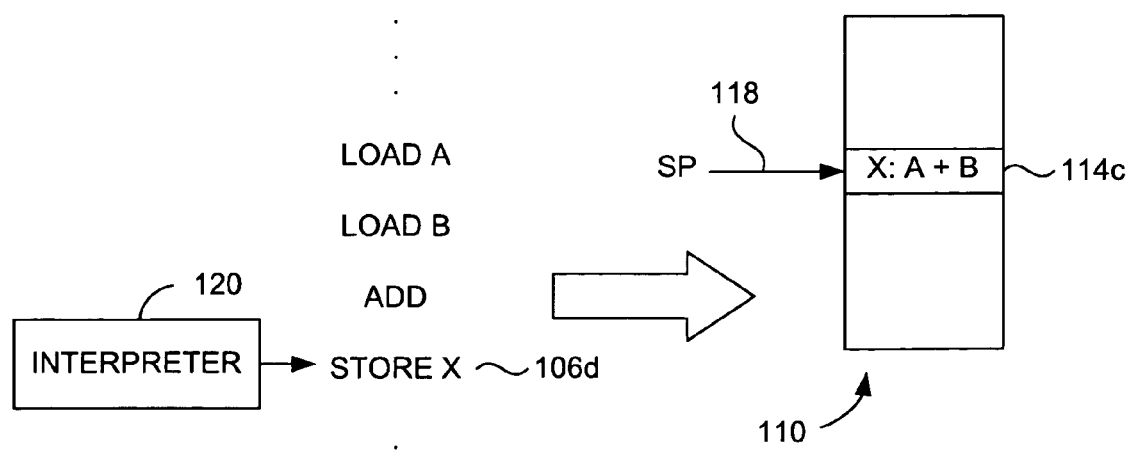

As shown in FIG. 1d, once interpreter 120 completes an interpretation cycle associated with second instruction 106b, a third instruction 106c may be executed. In the described embodiment, third instruction 106c is an add operation which adds values A and B, and pushes the result of adding values A and B onto location 114a of stack 110. It should be appreciated that once the sum of values A and B is determined, the result of the sum is stored on stack 110 such that values A and B are displaced from stack 110. Finally, after interpreter 120 completes another interpretation cycle, a fourth instruction 106d is executed, and the result stored in location 114a is removed as shown in FIG. 1d. Once the result is removed from location 114a, the result is effectively placed into location 114c which is associated with variable X.

In essence, with respect to FIGS. 1a–e, after the values of A and B are loaded onto the stack using an interpreted program, the values of A and B may be added and removed from the stack with the result of the summation of A and B being placed on the stack. The result of the summation placed on the stack may then be stored in a location associated with variable X, and the result of the summation may be removed from the stack.

Figure 2A:
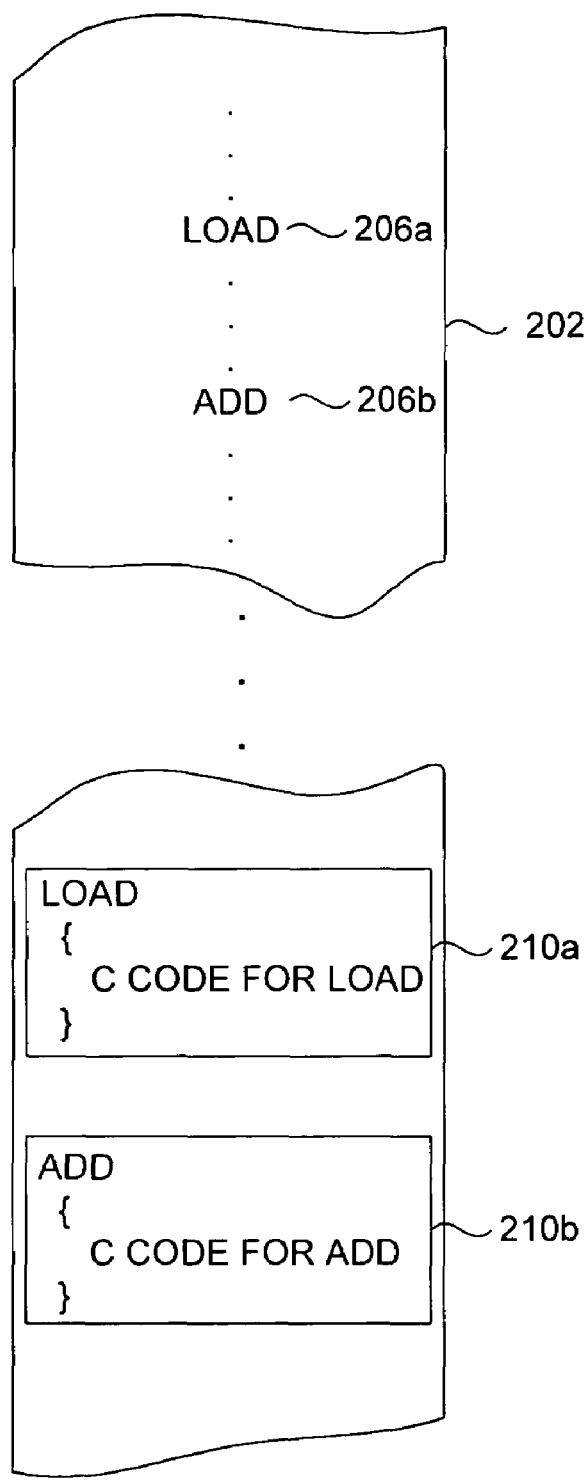
FIG. 2a is a diagrammatic representation of instructions of an interpreted program which are associated with blocks of code in accordance with an embodiment of the present invention.

While running an interpreted program, blocks of code associated with instructions may be executed by effectively "jumping to" an appropriate block of code when the associated instruction is executed. FIG. 2a is a diagrammatic representation of instructions of an interpreted program which are associated with blocks of code in accordance with an embodiment of the present invention. An interpreted program 202 may include instructions 206 such as a load instruction 206a and an add instruction 206b. While executing interpreted program 202, when an interpreter executes load instruction 206a, interpreter effectively executes a block 210 of code that is associated with load instruction 206a, i.e., block 210a.

As shown, block 210a includes code written in the C programming language that executes a load operation. That is, block 210a contains C code that is associated with interpreted load instruction 206a. The code contained in block 210a may be native C code. Just as code contained in block 210a may be native C code associated with load instruction 206a, code contained in block 210b may be native C code associated with add instruction 206b. It should be understood that although blocks 210 have been described as including code written in the C programming language, the code associated with blocks 210 may instead by written in substantially any computing language which allows copying of blocks of code segments.

Native code generally includes native machine instructions which are machine instructions that are essentially designed for a specific microprocessor or computer architecture. As will be appreciated by those skilled in the art, a machine instruction is an instruction that directs a computer to perform an operation specified by an operation code and, in some cases, one or more operands.

Figure 2B:
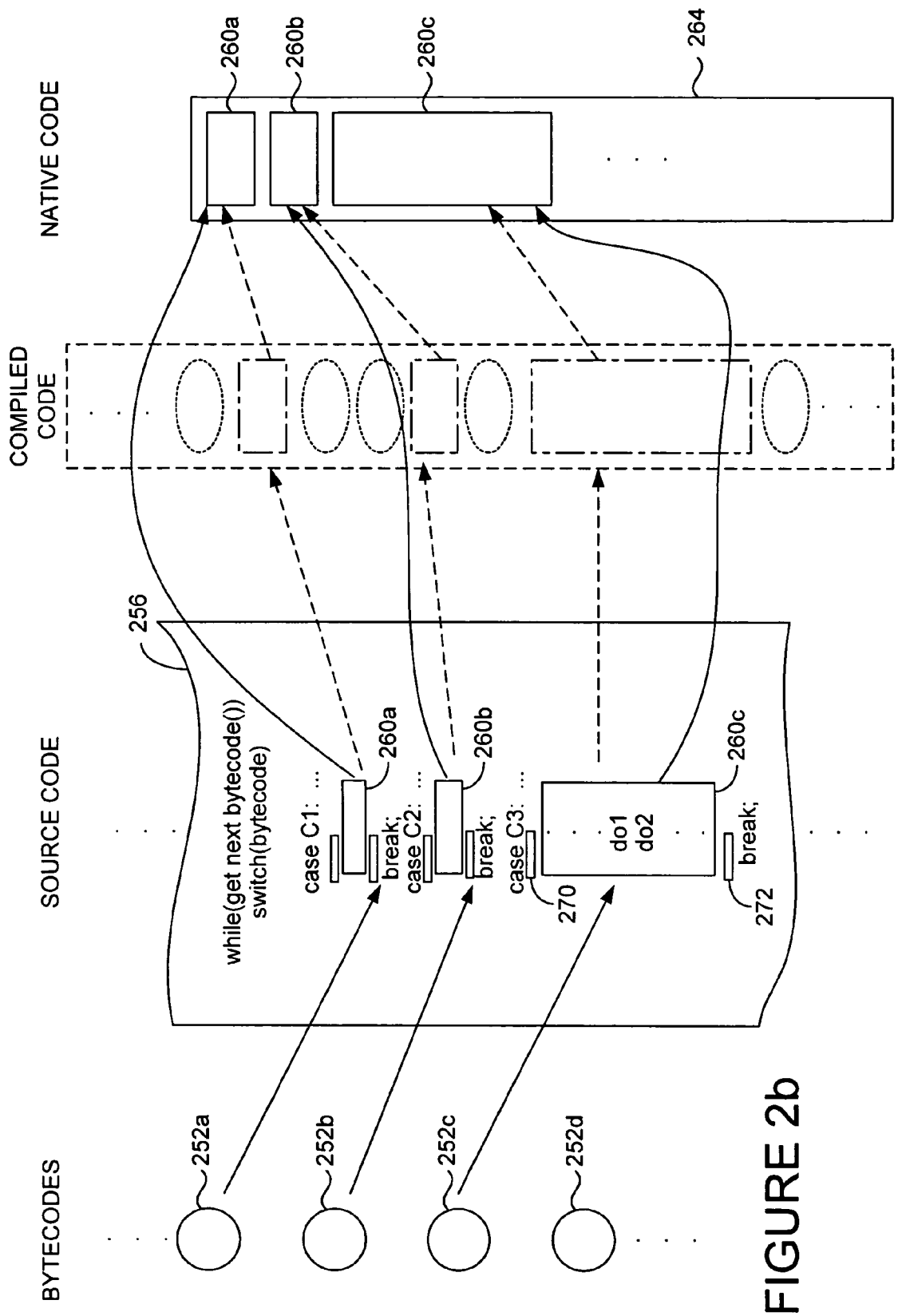
FIG. 2b is a diagrammatic representation of bytecodes, source code, and native code stored in a native code cache in accordance with an embodiment of the present invention.

FIG. 2b is a diagrammatic representation of a system which includes a native code cache in accordance with an embodiment of the present invention. As shown, a stream of bytecodes 252 corresponds to source code 256 for an interpreter. Although source code 256 may be written in substantially any computing language, in one embodiment, source code 256 may be written in the C computer language.

Source code 256 generally includes a switch operator which "executes" bytecodes 252 as long as there are bytecodes 252 to obtain. Source code 256 includes cases which correspond to actions performed on specific arguments associated with bytecodes 252. The cases include case blocks 260 which correspond to specific bytecodes 252. As shown, bytecode 252a corresponds to case block 260a, bytecode 252b corresponds to case block 260b, and bytecode 252c corresponds to case block 260c.

Conventionally, case blocks 252 would generally be compiled into compiled code or an intermediate representation, which would then be transformed into instructions, e.g., native code, which would be executed by a processor. In the described embodiment, however, compiled code, or an intermediate representation of source code 256, is not generated. Instead, case blocks 252 may be copied substantially directly into a native code cache 264. It should be understood by those skilled in the art that case blocks 252 generally include only indirect calls due to addressing issues.

To facilitate the copying of case blocks 252 substantially directly into native code cache 264, labels may be implemented around case blocks 252 to delineate the beginning and end of a specific case block, e.g., case block 252c. By way of example, a beginning label 270 and an ending label 272 may be inserted before case block 252 and at the end of case block 252, respectively. Ending label 272 is placed before a break instruction which typically terminates each case. The use of labels 270 and 272 enables code which is to be copied into native code cache 264 to be denoted and, hence, readily identified.

In addition to having boundaries on case blocks 252, or blocks of source code, such that case blocks 252 may be substantially exactly identified, case blocks 252 are arranged to be manipulated at a source code level. The ability to manipulate case blocks 252 at a source code level enables a target to be substantially platform independent.

Figure 2C:
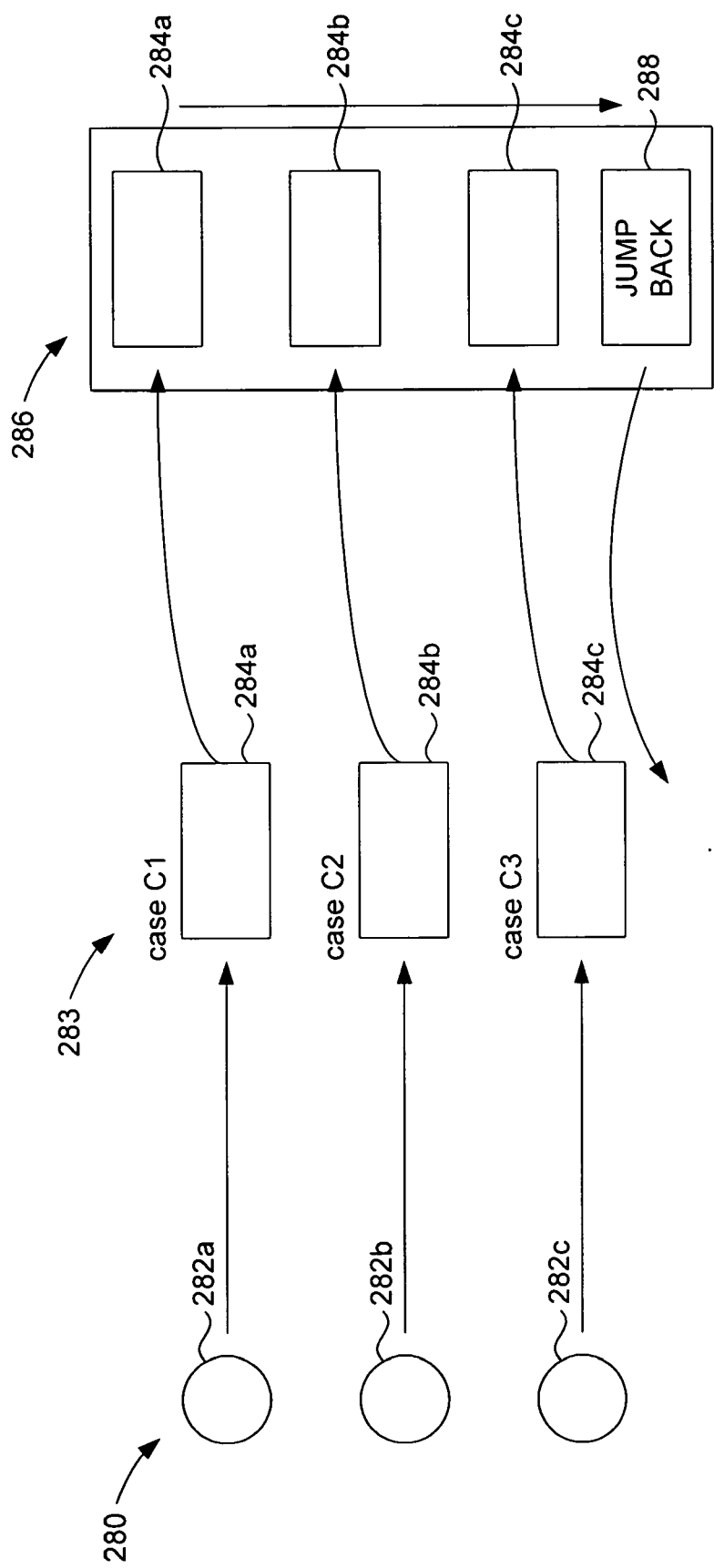
FIG. 2c is a diagrammatic representation of a flow of execution associated with bytecodes, source code, and native instructions in accordance with an embodiment of the present invention.

As shown in FIG. 2c, when a stream 280 of bytecodes 282 is interpreted by an interpreter 283 which includes case blocks 284, the case blocks 284 may be copied substantially directly, e.g., without the creation of an intermediate representation, into native code cache 286. When a processor finishes executing a code segment, e.g., a segment including case blocks 284a–c, in native code cache 286, a jump back instruction 288 in native code cache 286 effectively returns control to interpreter 283, which has no control while a processor executes code segments in native code cache 286.

Figure 3:
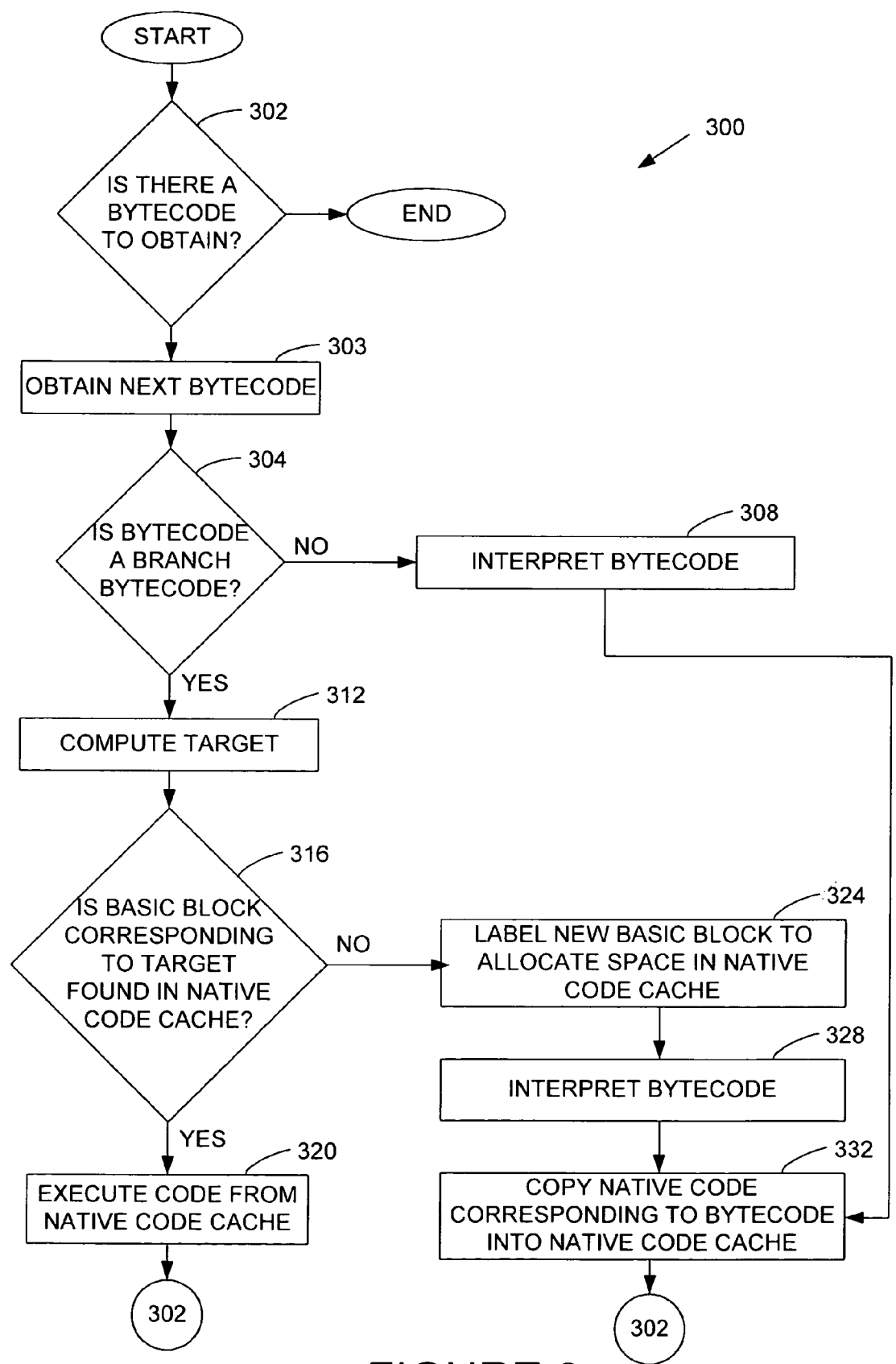
FIG. 3 is a process flow diagram which illustrates the steps associated with processing a bytecode in accordance with an embodiment of the present invention.

With reference to FIG. 3, the processing of a bytecode associated with a program will be described in accordance with an embodiment of the present invention. A process 300 begins when the "next" instruction or bytecode in a program is to be executed. In step 302, a determination is made as to whether there is a bytecode to obtain. If there is no bytecode to obtain, then the process terminates. Alternatively, when it is determined that there is a bytecode to obtain, then process flow proceeds to step 303 in which the next bytecode to obtain is obtained.

After the bytecode is obtained, a determination is made in step 304 regarding whether the obtained bytecode, i.e., the next bytecode to be executed, is a branch bytecode. A branch bytecode, in one embodiment, may be a bytecode that has a corresponding section or block that is to be run, as described above with respect to FIG. 2. If it is determined in step 304 that the bytecode is not a branch bytecode, then the bytecode is a "regular" bytecode. Accordingly, in step 308, the bytecode is interpreted. Once the bytecode is interpreted, then process flow returns to step 302 and the determination of whether there are more bytecodes to be obtained. Alternatively, if it is determined in step 304 that the bytecode is a branch bytecode, then the implication is that the bytecode has an associated block of code. As such, process flow proceeds to step 312 in which a target is computed. Computing a target involves interpreting bytecodes.

Once a target is computed in step 312, a determination is made in step 316 as to whether a basic block which corresponds to the target is found in a native code cache. In one embodiment, such a determination may be made by searching through a "label" table which effectively lists labels associated with basic blocks which are present in the native cache. Specifically, the target may be compared against labels in the label table to determine if a corresponding basic block, e.g., case block 260c of FIG. 2b, is present in the native code cache. If it is determined in step 316 that a basic block corresponding to the target is cached in the native code cache, the code associated with the basic block is executed in step 320. After the code is executed, process flow returns to step 302 in which a determination is made as to whether there is another bytecode to obtain. Typically, the code associated with the basic block ends with a branch, or jump, instruction to return from the basic block to approximately the point in the program which resulted in the execution of the basic block. A basic block is generally a sequence of instructions which start and end at the same place. That is, a basic block is a section of code with no branching and no internal labels. Typically, a basic block ends with a branch instruction.

When it is determined in step 316 that a basic block corresponding to the target is not already in the native code cache, process flow moves from step 316 to step 324 in which a new basic block may be labeled. In the described embodiment, labeling the new basic block also includes indexing the label in the label table, as well as allocating space in the native code cache. Substantially any suitable method may be used to allocate space in the native code cache, as will be appreciated by those skilled in the art. Once space is allocated in the native code cache, then the bytecode is interpreted in step 328. After the bytecode is interpreted, the native code corresponding to the bytecode is copied into the native code cache in step 332. Specifically, the native code corresponding to the bytecode is copied into the native code cache in the space that was allocated in step 324. Once the native code is copied, process flow returns to step 302 and the determination of whether there is another bytecode to obtain.

In one embodiment, code which allows the copying of the native code to be performed may be inserted within a program. Such code may effectively be code which determines where a block of native code is located, identifies where the block begins and ends, and copies the native code. The code which allows copying may be written in substantially any suitable programming language, as for example, the C programming language.

The copying of native code into a native code cache effectively removes the need for a compiler such as a JIT compiler. That is, no intermediate representation, e.g., no compiled representation, is needed to generate native code, and native code may be obtained substantially immediately. As such, the compilation overhead associated with a compiler such as a JIT compiler may be avoided.

Figure 4:
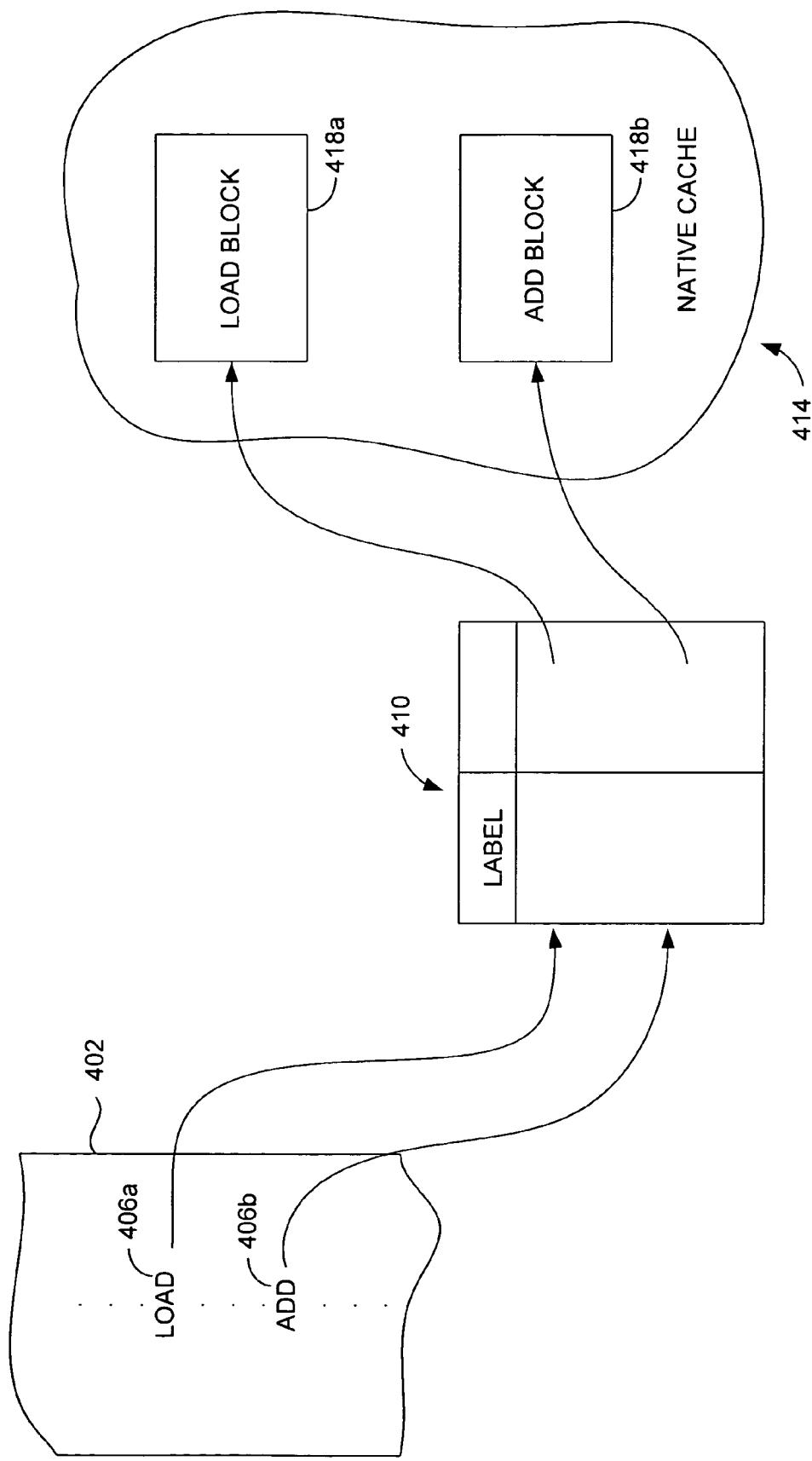
FIG. 4 is a diagrammatic representation of an interpreted program, a label table, and a native cache in accordance with an embodiment of the present invention.

As mentioned above with respect to FIG. 3, a label table is used in one embodiment to determine whether a particular basic block of native code is cached in a native cache. FIG. 4 is a diagrammatic representation of an interpreted program, a label table, and a native cache in accordance with an embodiment of the present invention. When an instruction or a bytecode 406a–b in a program 402 is to be executed, it is determined whether there is a basic block 418a–b associated with bytecode 406. A label table 410 is used to effectively map bytecodes 406 to blocks 418 stored within native code cache 414. If there in no entry in label table 410 for a particular bytecode 406, and it is appropriate for the particular bytecode 406 to have an entry, then space may be allocated within native code cache 414 for a block 418 that corresponds to the particular bytecode 406, and a label for the particular bytecode 406 may be created.

Figure 5:
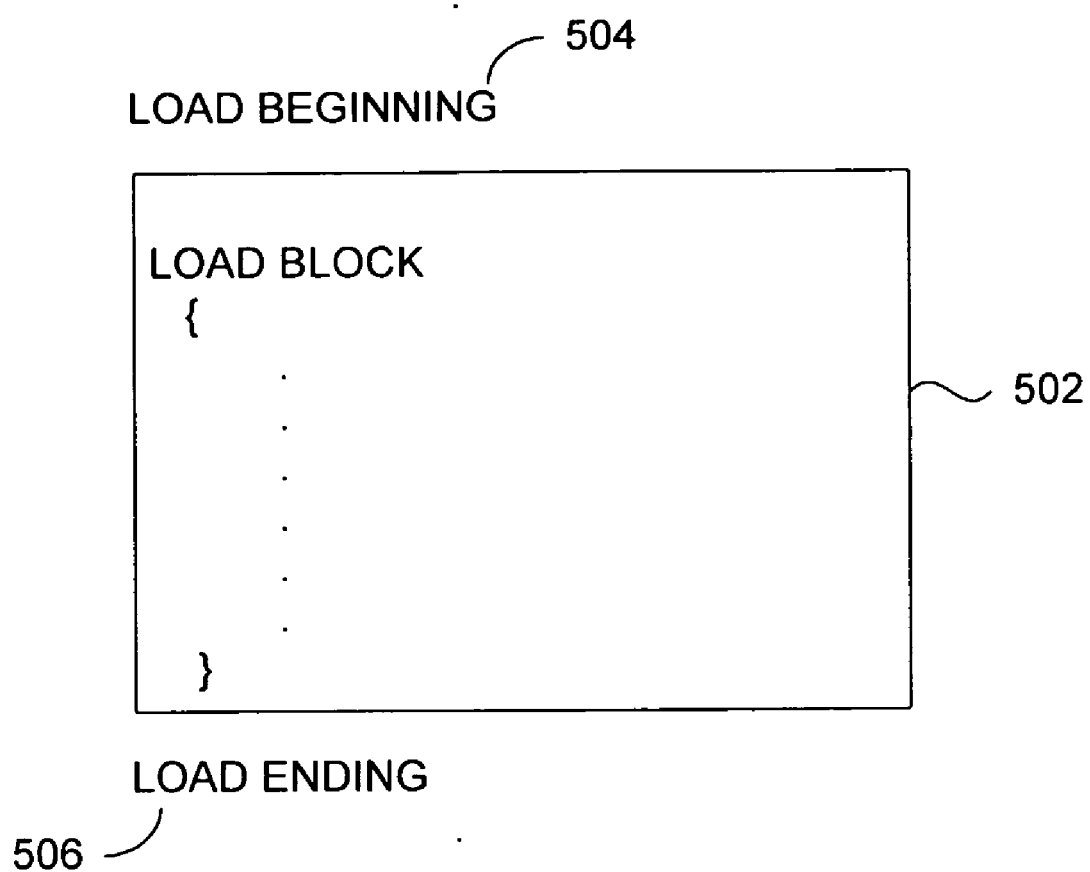
FIG. 5 is a diagrammatic representation of a native block of code with a beginning label and an ending label in accordance with an embodiment of the present invention.

In order to facilitate identifying basic blocks to be put in a native code cache, labels or identifiers may be placed at the beginning of blocks. Specifically, a block of code pertaining to a load instruction may have a "beginning" label which identifies the beginning of the block of code, as well as an "ending" label which identifies the end of the block of code. By way of example, as shown in FIG. 5, a block of native code 502 may be identified by a beginning label 504 and an ending label 506. Identifying where a block of native code begins and ends enables the block to be readily identified and copied into a native code cache.

As described above with respect to FIG. 3, a basic block may end with a branch or a jump instruction. Typically, a basic block may be entered subtantially only at a start point, and exited only at the branch instruction. In one embodiment, an extended basic block may be used in lieu of a basic block. Typically, an extended basic block is a sequence of instructions that may be entered at more than one start point, but includes only one exit point.

Table 1 below provides a code listing which implements the present invention. It should be understood that the code shown in Table 1 is an example of an embodiment of the present invention. In general, substantially any language which enables blocks of code to be copied may be used to implement the present invention.

TABLE 1

```
/*********************************************************************
    this is an interpreter implementing a very simple machine:
    there are 2 registers x and X
    comands with capital letter are applied to X
    comands with small letter are applied to x
    x? - load ? to x, where ? is a digit
    X? - load ? to X, where ? is a digit
    a? - add ? to x, where ? is a digit or X
    A? - add ? to X, where ? is a digit or x
    m - store in mem value of x - like calculator does
    r - restore x from mem
    M - store in mem value of X - like calculator does
    R - restore X from mem
    p - print content of x
    P - print content of X
    l?# - loop command, where ? and # are digits, the machine executes
    last ? commands (not includind l?#) # times
        -- NO NESTED LOOPS --
    S - print machine state (for debugging)
        compile jit and/or interpreter :
        gcc Jit.c -g -DJIT=1 -o jit
        gcc Jit.c -g -o int
    cmd Line for inc 1..10 : jit x0 a1 p l29
    cmd Line for Fibbonacci(10) : jit x0 X1 p P m Ax r P l45
    cmd Line for Fibbonacci(46) : jit x0 X1 p P m Ax r P l49 m Ax r P l49
    m Ax r P l49 m Ax r P l49 m Ax r P l44
*********************************************************************/
```

TABLE 1-continued

```
#if DBG > 2
    #define PRINTF( a, args...) printf( a, ##args )
    #define PRINT( a, args...) print( a, ##args )
#else
    #define PRINTF(a, args...)
    #define PRINT(a, args...)
#endif
#if DBG > 1
    #define PR_STATE( ) printSt(__LINE__);
#else
    #define PR_STATE( )
#endif
#define PRSTATE( ) printSt(0);
void Pr_state(int lineN ) {
    extern int cur, lcntr,x,X,m;
    extern char *freePtr;
    printf( "LN:%d cur=%d lcntr=%d x=%d \n", lineN ,cur,lcntr,x);
/*printf( "LN:%d cur=%d lcntr=%d x=%d X=%d m=%d freePtr=%x\n",\ **/
}
#if JIT
#define JSTART(n) \
    Strt_## n: \
    { \
    PR_STATE( );
#define JEND(n) \
    PR_STATE( ); \
    } \
    End_## n: \
    pB =(int) &&Strt_## n; \
    pE =(int) &&End_## n; \
    csz = pE - pB; \
    bcopy(pB,freePtr,csz); \
    freePtr += csz; \
    PR_STATE( );
#else
    #define JSTART(n) PR_STATE( );
    #define JEND(n) PR_STATE( );
#endif
/*********************** ********************/
char ncache[10000];
void* nTable[100];
char *freePtr= ncache;
char ret[40];
int rsize;
char curpp [20];
int curppsize;
void (*print)(char *, int);
void (*printSt)(int);
void Print(char *s, int x) { printf(" %s = %d\n", s,x); }
int nothing = 0;
/* they are locals, I put it here for debug */
    int cur;
    int lcntr=0;
    int x, X;
    int m=0;
main(int argc, char *argv[] ){
    char *tkn;
    int pB, pE;
    int csz;
    int x1;
    print = Print;
    printSt = Pr_state;
#if JIT
/* setup the jit
build ret_jmp to interppreter loop
*/
{
__label__ StrtR, EndR;
    void *rt = &&RetLabel;
    if(nothing){
StrtR:
        goto *rt;
EndR:
    }
    pB =(int) &&StrtR;
    pE =(int) &&EndR;
    x1= pE - PB;
    bcopy(pB,ret,x1);
    rsize=x1;
```

TABLE 1-continued

```
}
#endif
/* Interpreter */
        for(cur=1; cur< argc; ) {
                switch ( tkn[0] ) {
                    case 'x' :
JSTART(1)
                        x = (tkn[1]-'0');
                        cur++;
                        tkn = argv[cur];
JEND(1)
                        break;
                    case 'X' :
JSTART(2)
                        X = (tkn[1]-'0');
                        cur++;
                        tkn = argv[cur];
JEND(2)
                        break;
                    case 'a' :
JSTART(3)
                        if( tkn[1] == 'X' )
                            x += X;
                        else
                            x += (tkn[1]-'0');
                        cur++;
                        tkn = argv[cur];
JEND(3)
                        break;
                    case 'A' :
JSTART(4)
                        if( tkn[1] == 'x' )
                            X += x;
                        else
                            X += (tkn[1]-'0');
                        cur++;
                        tkn = argv[cur];
JEND(4)
                        break;
                    case 'm' :
JSTART(5)
                        m = X;
                        cur++;
                        tkn = argv[cur];
JEND(5)
                        break;
                    case 'r' :
JSTART(6)
                        x = m;
                        cur++;
                        tkn = argv[cur];
JEND(6)
                        break;
                    case 'l' :
JSTART(7)
                        if( lcntr > 0 ) {
                            lcntr--;
                            if( lcntr > 0 )
                                cur -= tkn[1]-'0';
                            else
                                cur++;
                        }
                        else {
                            cur -= tkn[1]-'0';
                            lcntr = tkn[2] - '0';
                        }
                        tkn = argv[cur];
JEND(7)
#if JIT
PR_STATE( );
                        bcopy(ret,freePtr,rsize);
                        freePtr += rsize;
                        /* return here from native after BB is over
                        */
RetLabel:
                        /* loop do jitiing */
                        if( nTable[cur] != 0 )
                            goto *(nTable[cur]);
                        else { /* new nblock */
```

TABLE 1-continued

```
            nTable[cur] = freePtr;
        }
#endif
        break;
    case 'p' :
JSTART(8)
        print("x", x);
        cur++;
        tkn = argv[cur];
JEND(8)
        break;
    case 'P':
JSTART(9)
        print("X", X);
        cur++;
        tkn = argv[cur];
JEND(9)
        break;
    case 'S' :
JSTART(10)
        PRSTATE( );
JEND(10)
        break;
    default:
        cur++; /* ignore bad command */
        tkn = argv[cur];
    }
  }
}
```

Figure 6:
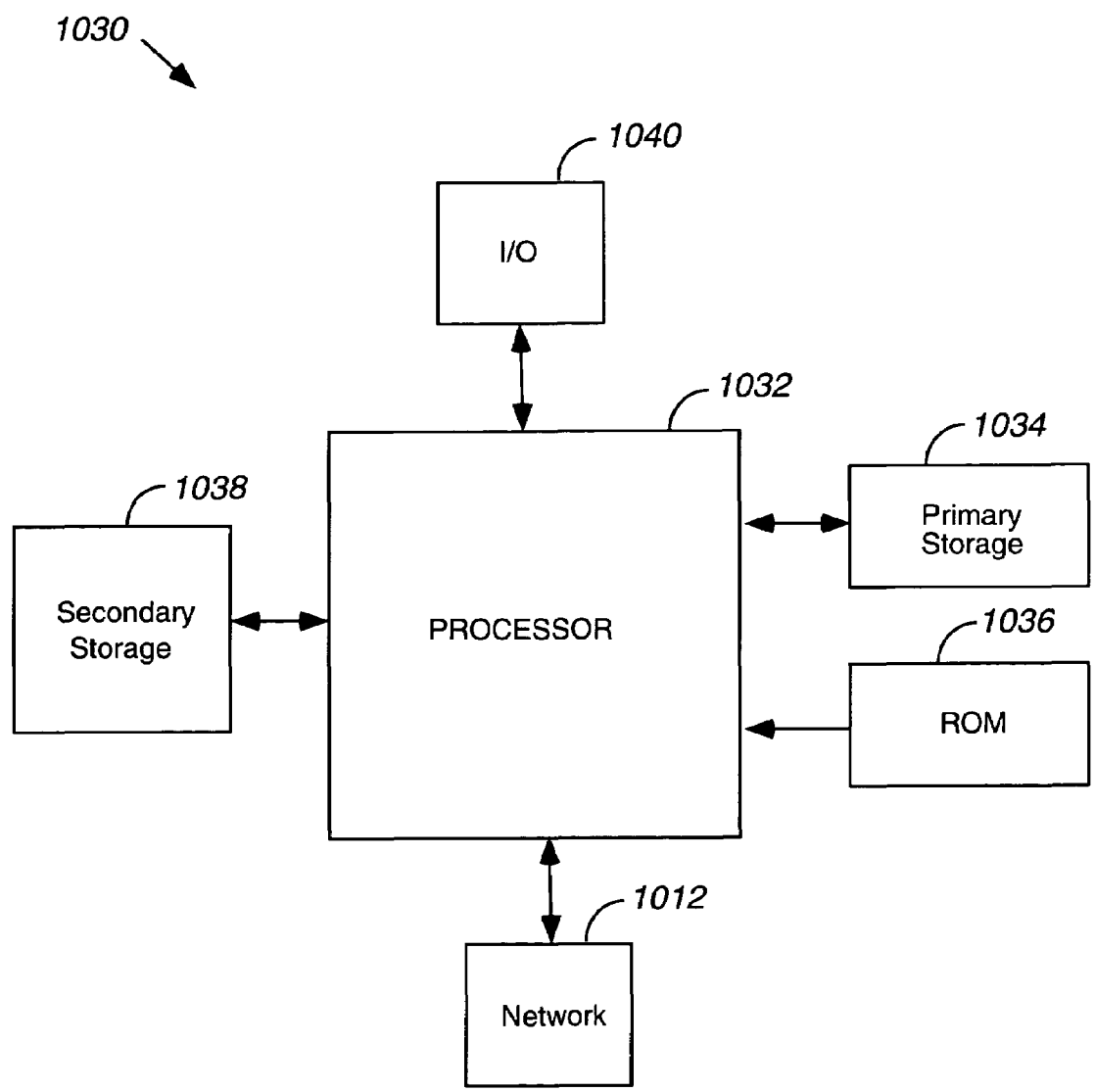
FIG. 6 is a diagrammatic representation of a typical, general-purpose computer system suitable for implementing the present invention.

FIG. 6 illustrates a typical, general-purpose computer system suitable for implementing the present invention. The computer system 1030 includes at least one processor 1032 (also referred to as a central processing unit, or CPU) that is coupled to memory devices including primary storage devices 1036 (typically a read only memory, or ROM) and primary storage devices 1034 (typically a random access memory, or RAM).

Computer system 1030 or, more specifically, CPUs 1032, may be arranged to support a virtual machine, as will be appreciated by those skilled in the art. One example of a virtual machine that may be supported on computer system 1030 will be described below with reference to FIG. 7. As is well known in the art, ROM acts to transfer data and instructions uni-directionally to the CPUs 1032, while RAM is used typically to transfer data and instructions in a bi-directional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an internet network or an intranet network, using a network connection as shown generally at 1012. With such a network connection, it is contemplated that the CPUs 1032 might receive information from the network, or might output information to the network in the course of performing the above-described method steps. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

Figure 7:
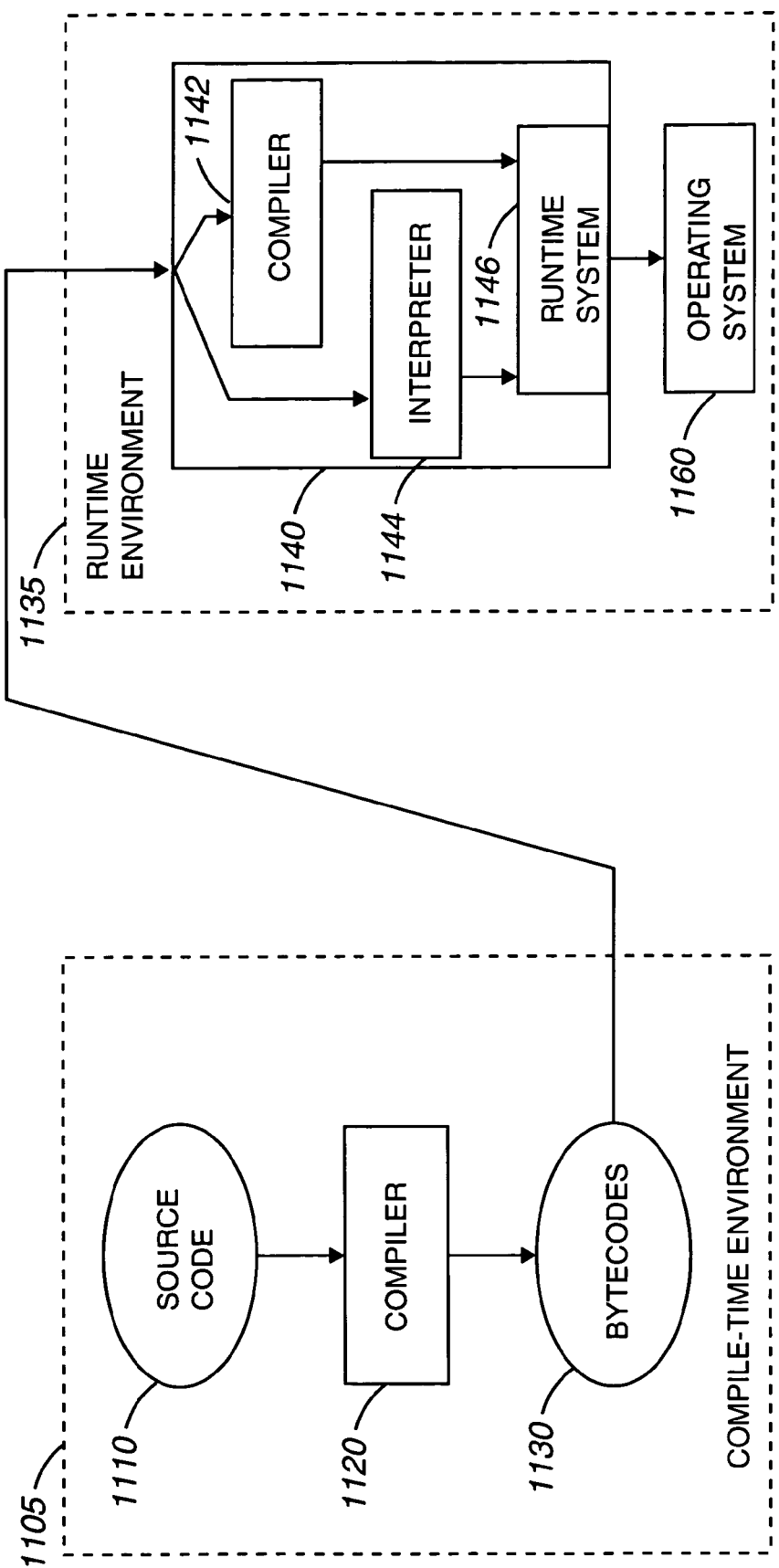
FIG. 7 is a diagrammatic representation of a virtual machine suitable for implementing the present invention.

As previously mentioned, a virtual machine may execute on computer system 1030. FIG. 7 is a diagrammatic representation of a virtual machine which is supported by computer system 1030 of FIG. 6, and is suitable for implementing the present invention. When a computer program, e.g., a computer program written in the Jav programming language, is executed, source code 1110 is provided to a compiler 1120 within compile-time environment 1105. Compiler 1120 translates source code 1110 into bytecodes 1130. In general, source code 1110 is translated into bytecodes 1130 at the time source code 1110 is created by a software developer.

Bytecodes 1130 may generally be reproduced, downloaded, or otherwise distributed through a network, e.g., network 1012 of FIG. 6, or stored on a storage device such as primary storage 1034 of FIG. 6. In the described embodiment, bytecodes 1130 are platform independent. That is, bytecodes 1130 may be executed on substantially any computer system that is running on a suitable virtual machine 1140.

Bytecodes 1130 are provided to a runtime environment 1135 which includes virtual machine 1140. Runtime environment 1135 may generally be executed using a processor or processors such as CPUs 1032 of FIG. 6. Virtual machine 1140 includes a compiler 1142, an interpreter 1144, and a runtime system 1146. Bytecodes 1130 may be provided either to compiler 1142 or interpreter 1144.

When bytecodes 1130 are provided to compiler 1142, methods contained in bytecodes 1130 are compiled into machine instructions. In one embodiment, compiler 1142 is a just-in-time compiler which delays the compilation of methods contained in bytecodes 1130 until the methods are about to be executed. When bytecodes 1130 are provided to interpreter 1144, bytecodes 1130 are read into interpreter 1144 one bytecode at a time. Interpreter 1144 then performs the operation defined by each bytecode as each bytecode is read into interpreter 1144. That is, interpreter 1144 "interprets" bytecodes 1130, as will be appreciated by those skilled in the art. In general, interpreter 1144 processes bytecodes 1130 and performs operations associated with bytecodes 1130 substantially continuously.

When a method is invoked by another method, or is invoked from runtime environment 1135, if the method is interpreted, runtime system 1146 may obtain the method from runtime environment 1135 in the form of a sequence of bytecodes 1130, which may be directly executed by interpreter 1144. If, on the other hand, the method which is invoked is a compiled method which has not been compiled, runtime system 1146 also obtains the method from runtime environment 1135 in the form of a sequence of bytecodes 1130, then may go on to activate compiler 1142. Compiler 1142 then generates machine instructions from bytecodes 1130, and the resulting machine-language instructions may be executed directly by CPUs 1032. In general, the machine-language instructions are discarded when virtual machine 1140 terminates. The operation of virtual machines or, more particularly, Java virtual machines, is described in more detail in *The Java™ Virtual Machine Specification* by Tim Lindholm and Frank Yellin (ISBN 0-201-63452-X), which is incorporated herein by reference.

Although only a few embodiments of the present invention have been described, it should be understood that the present invention may be embodied in many other specific forms without departing from the spirit or the scope of the present invention. By way of example, although the present invention has generally been described in terms of a Java virtual machine, it should be appreciated that the present invention may generally be applied to any suitable virtual machine. Examples of suitable virtual machines include, but are not limited to, a Smalltalk virtual machine.

The basic blocks of the present invention, as well as the blocks of code associated with instructions such as load or push instructions, may generally include instructions written in the C programming language. However, it should be understood that blocks of code such as basic blocks may generally be associated with instructions written in substantially any suitable programming language.

The steps associated with executing a bytecode or an instruction may be varied. Steps may be added, removed, altered, and re-ordered. For example, the process of executing a bytecode may be such that when a jump is made to a native code cache in order to execute a block of native code, it may be possible for a jump not to be made back from the block of native code until after a next instruction is obtained.

It should be understood that the copying of native code into a native code cache without the need to generate an intermediate representation of the code is generally applicable to any interpreter which is coded to have distinguishable blocks of source code that is responsible for interpretation of different input instructions. A suitable interpreter would generally also be coded such that there are effectively no jumps from within one block into another. As described above, such an interpreter may be coded to include a switch instruction which uses case blocks, as described above with respect to FIG. 2*b*. Alternatively, such an interpreter may be implemented with a series of "if" and "else if" statements without departing from the spirit or the scope of the present invention. Therefore, the present examples are to be considered as illustrative and not restrictive, and the invention is not to be limited to the details given herein, but may be modified within the scope of the appended claims.

What is claimed is:

1. A computer-implemented method for executing computer code by a virtual machine that uses an interpreter to execute virtual machine program instructions, the computer-implemented method comprising:

obtaining, by an interpreter, a virtual machine program instruction to be executed by the virtual machine;

determining, by the interpreter, whether the virtual machine program instruction is a branch instruction;

determining, by the interpreter, whether a basic block is present in a code cache that stores native code corresponding to virtual machine program instructions when it is determined that the virtual machine program instruction is a branch instruction to be executed by said virtual machine, wherein the basic block is associated with a case block of the interpreter, wherein the case block corresponds to the virtual machine program instruction and the basic block includes native code corresponding to the virtual machine program instruction that has been previously interpreted and executed by the interpreter, thereby determining by the interpreter whether native code needed to execute the virtual machine program instructions is available in the code cache;

executing the native code included in the basic block present in the code cache when it is determined by the interpreter that the basic block is present in the code cache and the virtual machine program instruction is a branch instruction;

interpreting, by the interpreter, the virtual machine instruction when said determining determines that the basic block associated with the case block of the interpreter is not present in the code cache, wherein said interpreting generates native code for the virtual machine instruction; and copying the native code generated by the interpreter into the code cache after the interpreting of the virtual machine program instruction by the interpreter when said determining determines that the basic block associated with the case block of the interpreter is not present in the code cache so that subsequently the native code can be obtained from the code cache, thereby enhancing the performance of the virtual machine.

2. A computer-implemented method as recited in claim 1 further including:

allocating space in the code cache for the code corresponding to the program instruction; and providing the code corresponding to the program instruction with a label.

3. A computer-implemented method as recited in claim 2 further including placing the label in a table of labels.

4. A computer-implemented method as recited in claim 1 wherein determining whether the basic block is present in the code cache includes searching through a table of labels to determine if a target associated with the program instruction has a matching label in the table of labels.

5. A computer-implemented method as recited in claim 1 wherein the program instruction is a bytecode, and wherein the bytecode is executed by an interpreter of the virtual machine.

6. A computer-implemented method as recited in claim 1 wherein the code cache is a native code cache, and the code corresponding to the program instruction is native code.

7. A computer-implemented method as recited in claim 1 wherein the program instruction is a bytecode and the code cache is a native code cache.

8. A computer-implemented method as recited in claim 7 further including interpreting the bytecode when the determining determines that the program instruction is not a branch instruction.

9. A computer-implemented method as recited in claim 1 further including:
computing a target using the program instruction, wherein the determining of whether the basic block is present in the code cache includes determining if the code cache includes any basic blocks which correspond to the target.

10. An apparatus for increasing the performance of a virtual machine that uses an interpreter to execute virtual machine program instructions, wherein the apparatus performs to:
obtain a virtual machine program instruction to be executed by the virtual machine;
determine whether the virtual machine program instruction is a branch instruction;
determine whether a basic block is present in a code cache that stores native code corresponding to virtual machine program instructions when it is determined that the virtual machine program instruction is a branch instruction to be executed by said virtual machine, wherein the basic block is associated with a case block of the interpreter, wherein the case block corresponds to the virtual machine program instruction and the basic block includes native code corresponding to the virtual machine program instruction, that has been previously interpreted and executed by the interpreter thereby determining by the interpreter whether native code needed to execute the virtual machine program instructions is available in the code cache;
execute the native code included in the basic block present in the code cache when it is determined by the interpreter that the basic block is present in the code cache and the virtual machine program instruction is a branch instruction;
interpret the virtual machine instruction when said determining determines that the basic block associated with the case block of the interpreter is not present in the code cache, wherein said interpreting generates native code for the virtual machine instruction; and
copy the native code generated by the interpreter into the code cache after the interpreting of the virtual machine program instruction by the interpreter when said determining determines that the basic block associated with the case block of the interpreter is not present in the code cache so that subsequently the native code can be obtained from the code cache, thereby enhancing the performance of the virtual machine.

11. A computer readable medium including computer program code for increasing the performance of a virtual machine that uses an interpreter to execute virtual machine program instructions, wherein computer readable medium comprises:
computer program code for obtaining by an interpreter a virtual machine program instruction to be executed by the virtual machine;
computer program code for determining by the interpreter whether the virtual machine program instruction is a branch instruction;
computer program code for determining by the interpreter whether a basic block is present in a code cache that stores native code corresponding to virtual machine program instructions when it is determined that the virtual machine program instruction is a branch instruction to be executed by said virtual machine, wherein the basic block is associated with a case block of the interpreter, wherein the case block corresponds to the virtual machine program instruction and the basic block includes native code corresponding to the virtual machine program instruction, that has been previously interpreted and executed by the interpreter thereby determining by the interpreter whether native code needed to execute the virtual machine program instructions is available in the code cache;
computer program code for executing the native code included in the basic block present in the code cache when it is determined by the interpreter that the basic block is present in the code cache and the virtual machine program instruction is a branch instruction;
computer program code for interpreting by the interpreter the virtual machine instruction when said determining determines that the basic block associated with the case block of the interpreter is not present in the code cache, wherein said interpreting generates native code for the virtual machine instruction; and
computer program code for copying the native code generated by the interpreter into the code cache after the interpreting of the virtual machine program instruction by the interpreter when said determining determines that the basic block associated with the case block of the interpreter is not present in the code cache so that subsequently the native code can be obtained from the code cache, thereby enhancing the performance of the virtual machine.

* * * * *